United States Patent
Toriyabe

(10) Patent No.: US 10,341,503 B2
(45) Date of Patent: Jul. 2, 2019

(54) REMOTE MAINTENANCE SYSTEM, IMAGE FORMING APPARATUS, EXTERNAL TERMINAL, METHODS OF CONTROLLING THESE, AND STORAGE MEDIUMS

(71) Applicant: CANON KABUSHIKI KAISHA, Tokyo (JP)

(72) Inventor: Hiroyuki Toriyabe, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/405,452

(22) Filed: Jan. 13, 2017

(65) Prior Publication Data
US 2017/0208184 A1    Jul. 20, 2017

(30) Foreign Application Priority Data
Jan. 19, 2016  (JP) ................. 2016-008286

(51) Int. Cl.
*H04N 1/00* (2006.01)
*G06F 3/12* (2006.01)

(52) U.S. Cl.
CPC ....... *H04N 1/00039* (2013.01); *G06F 3/1229* (2013.01); *H04N 1/00061* (2013.01); *H04N 1/00204* (2013.01); *H04N 1/00344* (2013.01); *H04N 2201/0039* (2013.01); *H04N 2201/0082* (2013.01)

(58) Field of Classification Search
CPC ........... H04N 1/00002; H04N 1/00039; H04N 1/00061; H04N 1/00204; H04N 1/00344; H04N 2201/0082; H04N 2201/0039; G06F 3/1247; G06F 3/1229

USPC ........ 358/1.1, 1.9, 1.11–1.18, 400–404, 406, 358/504; 709/201–203, 213, 238, 248
See application file for complete search history.

(56) References Cited

U.S. PATENT DOCUMENTS

| | | | |
|---|---|---|---|
| 6,297,873 B1 * | 10/2001 | Furuya | G03B 27/32 355/27 |
| 6,894,792 B1 | 5/2005 | Abe | 358/1.15 |
| 2005/0138065 A1 * | 6/2005 | Ciriza | G06Q 10/10 |
| 2009/0316174 A1 * | 12/2009 | Kurahashi | G03G 15/5079 358/1.9 |
| 2012/0188596 A1 * | 7/2012 | Niles | G06F 3/1229 358/1.15 |
| 2014/0078541 A1 * | 3/2014 | Takano | G06F 3/1203 358/1.14 |
| 2015/0312427 A1 * | 10/2015 | Roulland | H04N 1/00344 358/1.15 |

FOREIGN PATENT DOCUMENTS

JP    H11-170627    6/1999

\* cited by examiner

*Primary Examiner* — Chad Dickerson
(74) *Attorney, Agent, or Firm* — Venable LLP

(57) ABSTRACT

An image forming apparatus accepts a start of the remote maintenance function for resolving a failure of the image forming apparatus in accordance with instructions of an operator using an external terminal, generates support data including information of at least one of device information of the print server and device information of the image forming apparatus, which is that is information necessary when the operator analyzes the failure of the image forming apparatus, and transmits it to the external terminal.

17 Claims, 16 Drawing Sheets

FIG. 5

| ITEM | VALUE |
|---|---|
| SOFTWARE VERSION | 3.4.0 |
| FINISHER VERSION | 2.1.0 |
| PRINT DENSITY | NORMAL |
| PRIORITY DISCHARGE DESTINATION | FINISHER TOP TRAY |
| ENERGY SAVING FUNCTION | ON |

~500

| ITEM | VALUE |
|---|---|
| SOFTWARE VERSION | 1.5.0 |
| COLOR PROFILE | JapanColor2011 |
| TONER ECONOMIZATION | OFF |
| RESOLUTION | 1200dpi |
| USE MOBILE PRINT | YES |
| USE EMAIL SERVICE | NO |
| USE FTP PRINTING | NO |
| DOUBLE-SIDED PRINT | OFF |

~510

| DEVICE | ITEM | VALUE |
|---|---|---|
| PRINTER | SOFTWARE VERSION | 3.4.0 |
| PRINTER | FINISHER VERSION | 2.1.0 |
| PRINTER | PRINT DENSITY | NORMAL |
| PRINTER | PRIORITY DISCHARGE DESTINATION | FINISHER |
| PRINT SERVER | SOFTWARE VERSION | 1.5.0 |
| PRINT SERVER | COLOR PROFILE | JapanColor2011 |
| PRINT SERVER | TONER ECONOMIZATION | OFF |
| PRINT SERVER | RESOLUTION | 1200dpi |
| PRINT SERVER | USE MOBILE PRINT | YES |
| PRINT SERVER | USE EMAIL SERVICE | NO |
| PRINT SERVER | USE FTP PRINTING | NO |
| PRINT SERVER | DOUBLE-SIDED PRINT | OFF |

520

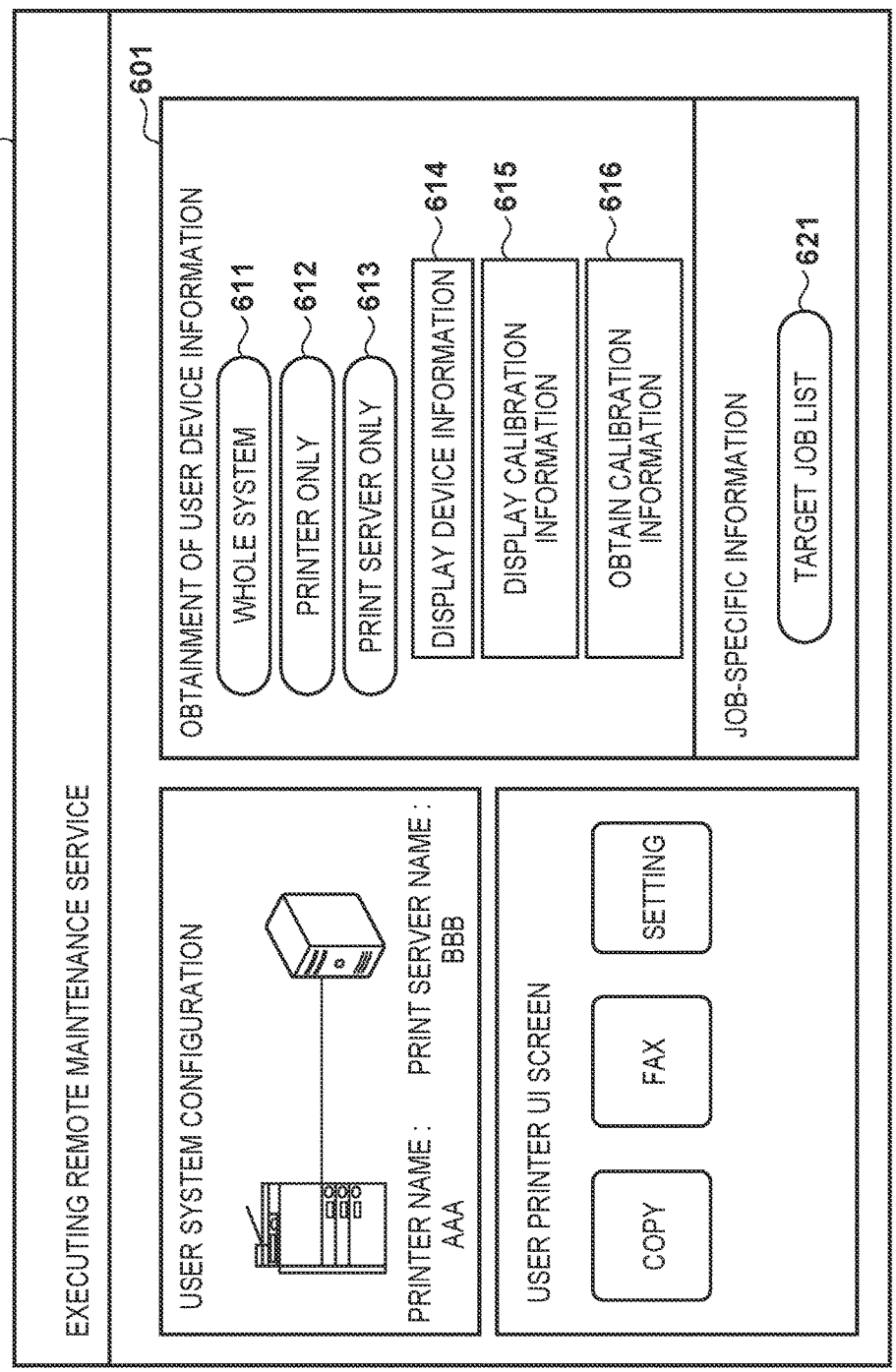

FIG. 7

EXECUTING REMOTE MAINTENANCE SERVICE - DEVICE INFORMATION

| DEVICE | ITEM | VALUE |
|---|---|---|
| PRINTER | SOFTWARE VERSION | 3.4.0 |
| PRINTER | FINISHER VERSION | 2.1.0 |
| PRINTER | PRINT DENSITY | NORMAL |
| PRINTER | PRIORITY DISCHARGE DESTINATION | FINISHER |
| PRINT SERVER | SOFTWARE VERSION | 1.5.0 |
| PRINT SERVER | COLOR PROFILE | JapanColor2011 |
| PRINT SERVER | TONER ECONOMIZATION | OFF |
| PRINT SERVER | RESOLUTION | 1200dpi |
| PRINT SERVER | USE MOBILE PRINT | YES |
| PRINT SERVER | USE EMAIL SERVICE | NO |
| PRINT SERVER | USE FTP PRINTING | NO |
| PRINT SERVER | DOUBLE-SIDED PRINT | OFF |

NEXT   BACK

FIG. 10

Color: Cyan

| INPUT SIGNAL VALUE [%] | TARGET DENSITY | MEASURED DENSITY |
|---:|---:|---:|
| 0 | 0.02 | 0.02 |
| 0.5 | 0.02 | 0.02 |
| 1 | 0.03 | 0.02 |
| 2 | 0.03 | 0.02 |
| 4 | 0.05 | 0.02 |
| 6 | 0.06 | 0.03 |
| 8 | 0.08 | 0.04 |
| 11 | 0.10 | 0.05 |
| 16 | 0.14 | 0.08 |
| 22 | 0.20 | 0.15 |
| 27 | 0.25 | 0.22 |
| 33 | 0.31 | 0.28 |
| 39 | 0.37 | 0.35 |
| 45 | 0.44 | 0.43 |
| 50 | 0.50 | 0.51 |
| 57 | 0.58 | 0.60 |
| 63 | 0.67 | 0.70 |
| 71 | 0.79 | 0.85 |
| 80 | 0.96 | 1.07 |
| 90 | 1.18 | 1.30 |
| 100 | 1.43 | 1.50 |

1001 = INPUT SIGNAL VALUE [%]
1002 = TARGET DENSITY
1003 = MEASURED DENSITY

F I G. 12

| No. | SHEET TYPE | HALFTONE SCREEN | |
|---|---|---|---|
| 1 | NORMAL PAPER | HIGH LPI | [DISPLAY] |
| 2 | GLOSSY PAPER | HIGH LPI | [DISPLAY] |
| 3 | THICK PAPER | LOW LPI | [DISPLAY] |
| 4 | NORMAL PAPER | LOW LPI | [DISPLAY] |

CALIBRATION INFORMATION LIST

BACK

F I G. 15

1500

| No. | PRINT JOB NAME | PRINT COMPLETION TIME | APPLIED CALIBRATION SETTING | SHEET |
|---|---|---|---|---|
| 1 | COMPANY A POSTER | 2015/10/28 11:30:25 | No.2 | COATED PAPER(100g-200g) |
| 2 | COMPANY B PRODUCT CATALOG | 2015/10/28 11:05:50 | No.4 | THICK PAPER(200g-300g) |
| 3 | COMPANY C SALES PROMOTION LEAFLET | 2015/10/28 10:40:45 | No.2 | COATED PAPER(200g-300g) |
| 4 | COMPANY D TRAINING BOOKLET | 2015/10/27 20:51:45 | No.1 | NORMAL PAPER(80g-200g) |

FIG. 16

| No. | PRINT JOB NAME | APPLIED CALIBRATION SETTING | SHEET |
|---|---|---|---|
| 1 | COMPANY A POSTER | No.2 | COATED PAPER (100g-200g) |
| 3 | COMPANY C SALES PROMOTION LEAFLET | No.2 | COATED PAPER (200g-300g) |

REMOTE MAINTENANCE SERVICE EXECUTING - INFORMATION FOR EACH JOB

NEXT    BACK

REMOTE MAINTENANCE SYSTEM, IMAGE FORMING APPARATUS, EXTERNAL TERMINAL, METHODS OF CONTROLLING THESE, AND STORAGE MEDIUMS

BACKGROUND OF THE INVENTION

Field of the Invention

The present invention relates to a remote maintenance system having a remote maintenance function, an image forming apparatus, an external terminal, methods of controlling these, and mediums.

Description of the Related Art

In recent years, as functions of image forming apparatuses and troubleshooting actions become more complex, users have been frequently directly making questions to a call-center of a maker to obtain responses. Furthermore, in order to perform troubleshooting between the image forming apparatus and the call-center quickly, remote maintenance services by voice, moving image communication, and remote operation have been considered. In a remote maintenance service, by using a remote operation function, it is possible for the operator to see the screen of the image forming apparatus of the user. By this, the operator can confirm device setting information of the image forming apparatus of the user in addition to trouble information elicited from the user. Using such information, the operator can analyze the cause of the failure, and present an appropriate response method to the user.

It is desirable that the foregoing remote maintenance service be deployed in an image forming system for a production market. This is because an image forming system for a production market includes a wide variety of functions, and the difficulty level in mastering such complicated functions is high. As a result, it is envisioned that many users will request support of the call-center. In an image forming system for a production market, a configuration in which an image forming apparatus and a print server, whose objective is to extend a print function, are connected is typical.

There is a need for a function in which, in an image forming system in which an image forming apparatus and a print server are configured, information of both apparatuses is compiled, and displayed on a screen in order to improve user or serviceman operationality. In Japanese Patent Laid-Open No. H11-170627, integrating information of copy jobs that an image forming apparatus processes and print jobs that a print server processes, and transmitting it to an external apparatus is proposed. Also, a list of jobs sorted in processing order are displayed on a screen of an external apparatus.

However, there is a problem as is recited below in the foregoing conventional technique. As mentioned above, in an image forming system for a production market, a configuration in which an image forming apparatus and a print server are configured is typical. If a failure occurs in the image forming system, the cause of the failure may be the image forming apparatus, the print server, or both. Therefore, the operator of the call-center requires information of both the image forming apparatus and the print server in order to analyze the cause of the failure.

However, in techniques that have spread in recent years, the remote maintenance service for the image forming apparatus unit is assumed, and information of a print server connected to the image forming apparatus is not transmitted to the operator terminal. For this reason, cases in which the operator cannot specify the cause of a failure arise, and the troubleshooting of the user environment ends up being slow.

Also, in the foregoing conventional technique, usage during the remote maintenance service is not envisioned. Furthermore, the information of a job that is transmitted to the external apparatus is the status of the job, the user name, the number of pages, the number of copies, or the like, and is not something whose object is application in the analysis of the cause of a failure.

SUMMARY OF THE INVENTION

The present invention enables realization of a mechanism which presents device information of both an image forming apparatus and a print server, which is necessary in analysis of the cause of a failure, to a remote operator in a remote maintenance service, and thereby allows for a reduction of downtime of a user environment and an optimization of failure analysis.

One aspect of the present invention provides a remote maintenance system including an image forming apparatus, a print server that executes some image processing of the image forming apparatus, and an external terminal, wherein the image forming apparatus comprises: a memory device that stores a set of instructions; at least one processor that executes the instructions to: accept a start of a remote maintenance function for resolving a failure of the image forming apparatus in accordance with an instruction of an operator that uses the external terminal, obtain, from the print server, device information of the print server which is information that is necessary when the operator analyzes the failure of the image forming apparatus, and generate support data including information of at least one of the obtained device information of the print server and device information of the image forming apparatus; and a transmission unit configured to transmit the generated support data to the external terminal, and the external terminal comprises: a reception unit configured to receive the support data transmitted by the transmission unit; and a display unit configured to display the support data received by the reception unit to an operation unit.

Another aspect of the present invention provides an image forming apparatus capable of communication with an external terminal and a print server that executes some image processing of the image forming apparatus, the image forming apparatus comprising: a memory device that stores a set of instructions; at least one processor that executes the instructions to: accept a start of a remote maintenance function for resolving a failure of the image forming apparatus in accordance with an instruction of an operator that uses the external terminal, obtain, from the print server, device information of the print server which is information that is necessary when the operator analyzes the failure of the image forming apparatus, and generate support data including information of at least one of the obtained device information of the print server and device information of the image forming apparatus; and a transmission unit configured to transmit the generated support data to the external terminal.

Still another aspect of the present invention provides an external terminal capable of communication with an image forming apparatus and a print server that executes some image processing of the image forming apparatus, comprising: a memory device that stores a set of instructions; at least one processor that executes the instructions to: in accordance with an input of an operator using the external terminal, set, from device information of the image forming apparatus and the print server, necessary device information which is information that is necessary when analyzing a failure of the image forming apparatus, and make a request to the image forming apparatus for the set necessary device information, a reception unit configured to receive from the image forming apparatus support data including information, which is the requested necessary information, of at least one of device information of the print server and device information of the image forming apparatus, and a display unit configured to display the support data received by the reception unit to an operation unit.

Yet another aspect of the present invention provides a method of controlling a remote maintenance system including an image forming apparatus, a print server that executes some image processing of the image forming apparatus, and an external terminal, the method comprising: in the image forming apparatus, accepting a start of a remote maintenance function for resolving a failure of the image forming apparatus in accordance with an instruction of an operator that uses the external terminal; in the image forming apparatus, obtaining, from the print server, device information of the print server which is information that is necessary when the operator analyzes the failure of the image forming apparatus; in the image forming apparatus, generating support data including information of at least one of the obtained device information of the print server and device information of the image forming apparatus; in the image forming apparatus, transmitting to the external terminal the generated support data; in the external terminal, receiving the transmitted support data; and in the external terminal, displaying to an operation unit the received support data.

Still yet another aspect of the present invention provides a method of controlling an image forming apparatus capable of communication with an external terminal and a print server that executes some image processing of the image forming apparatus, the method comprising: accepting a start of a remote maintenance function for resolving a failure of the image forming apparatus in accordance with an instruction of an operator that uses the external terminal; obtaining, from the print server, device information of the print server which is information that is necessary when the operator analyzes the failure of the image forming apparatus; generating support data including information of at least one of the obtained device information of the print server and device information of the image forming apparatus; and transmitting the generated support data to the external terminal.

Yet Still another aspect of the present invention provides a method of controlling an external terminal capable of communication with an image forming apparatus and a print server that executes some image processing of the image forming apparatus, the method comprising: in accordance with an input of an operator using the external terminal, setting, from device information of the image forming apparatus and the print server, necessary device information which is information that is necessary when analyzing a failure of the image forming apparatus; making a request to the image forming apparatus for the set necessary device information; receiving from the image forming apparatus support data including information, which is the requested necessary information, of at least one of device information of the print server and device information of the image forming apparatus, and displaying to an operation unit the received support data.

Still yet another aspect of the present invention provides a non-transitory computer-readable storage medium storing a computer program for causing a computer to execute a method of controlling an image forming apparatus that can communicate with a print server that executes some image processing of the image forming apparatus and an external terminal, the method comprising: accepting a start of a remote maintenance function for resolving a failure of the image forming apparatus in accordance with an instruction of an operator that uses the external terminal; obtaining, from the print server, device information of the print server which is information that is necessary when the operator analyzes the failure of the image forming apparatus; generating support data including information of at least one of the obtained device information of the print server and device information of the image forming apparatus; and transmitting the generated support data to the external terminal.

Yet Still another aspect of the present invention provides a non-transitory computer-readable storage medium storing a computer program for causing a computer to execute a method of controlling an external terminal that can communicate with an image forming apparatus and a print server that executes some image processing of the image forming apparatus, the method comprising: in accordance with an input of an operator using the external terminal, setting, from device information of the image forming apparatus and the print server, necessary device information which is information that is necessary when analyzing a failure of the image forming apparatus; making a request to the image forming apparatus for the set necessary device information; receiving from the image forming apparatus support data including information, which is the requested necessary information, of at least one of device information of the print server and device information of the image forming apparatus, and displaying to an operation unit the received support data.

Further features of the present invention will be apparent from the following description of exemplary embodiments with reference to the attached drawings.

BRIEF DESCRIPTION OF THE DRAWINGS

FIG. 5 is a view illustrating an example of support data according to an embodiment.

FIG. 6 is a view illustrating one example of a remote maintenance service UI screen 600 according to an embodiment.

FIG. 7 is a view illustrating one example of a device information display UI screen 700 according to an embodiment.

FIG. 10 is a view illustrating an example of calibration information data according to an embodiment.

FIG. 12 is a view illustrating an example of a list of calibration information UI screen 1200 according to an embodiment.

FIG. 15 is a view illustrating one example of already printed job information 1500 according to an embodiment.

FIG. 16 is a view illustrating one example of a list of target jobs screen 1600 for displaying job information according to an embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Configuration of a Remote Maintenance System>

Figure 1:
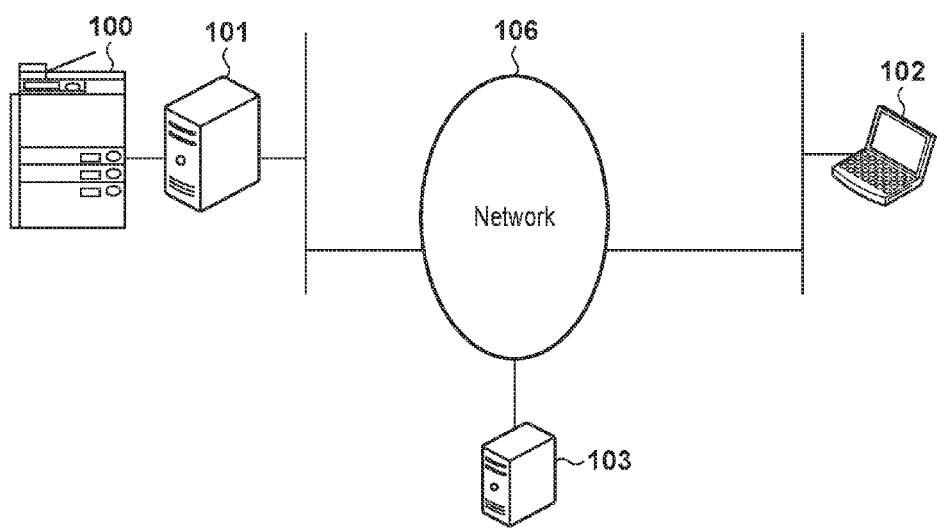
FIG. 1 is a view of a network configuration of a remote maintenance system.

Below, description will be given for a first embodiment of the present invention. Firstly, description will be given regarding a network configuration of a remote maintenance system (image forming system) according to the present embodiment with reference to FIG. 1.

The remote maintenance system (image forming system) is configured to include an image forming apparatus 100, a print server (information processing apparatus) 101, a relay server 103, and an operator terminal (external terminal) 102, and the respective apparatuses are connected to each other communicably. The image forming apparatus 100 and the operator terminal 102 are apparatuses that apply the present invention, have a speech, moving image communication, or remote operation remote maintenance function, and act as communication partners at a time of remote maintenance. The remote maintenance function is a function for resolving a failure of the image forming apparatus 100 in accordance with an instruction of an operator who uses the operator terminal 102. Specifically, it is a function in which information relating to a failure is transmitted from the image forming apparatus 100 to the operator terminal 102, the failure is analyzed in the operator terminal 102, and then an appropriate instruction is presented to a user of the image forming apparatus 100. The image forming apparatus 100 and the operator terminal 102 include HTTP client node communication functions. The relay server 103 includes an HTTP server communication function. The image forming apparatus 100 and the operator terminal 102 make an HTTP connection with the relay server 103 on a network 106 and performs communication for the remote maintenance via the relay server 103.

However, the print server 101 is connected to the image forming apparatus 100 via dedicated I/F unit. In the print server 101, an NAT (Network Address Translation) is implemented, and the image forming apparatus 100 accesses the network 106 via the print server 101. The print server 101 relays a communication to the network 106 that the image forming apparatus 100 transmits, and in a case when a reply from the network 106 exists, the print server 101 relays this to the image forming apparatus 100.

Additionally, the operator terminal 102 transmits data to the print server 101 in a case when the operator terminal 102 wishes to use a function (such as a Web service, for example) that the image forming apparatus 100 provides, or in a case when it wishes to perform data communication with the image forming apparatus 100. When the print server 101 receives this data, it relays it to the image forming apparatus 100. In a case when the image forming apparatus 100 transmits reply data, the print server 101 relays it to the operator terminal 102. By this, mutual communication with the operator terminal 102 via the network 106 is possible in the image forming apparatus 100 that the print server 101 is connected to.

<Hardware Configuration>

Figure 2:
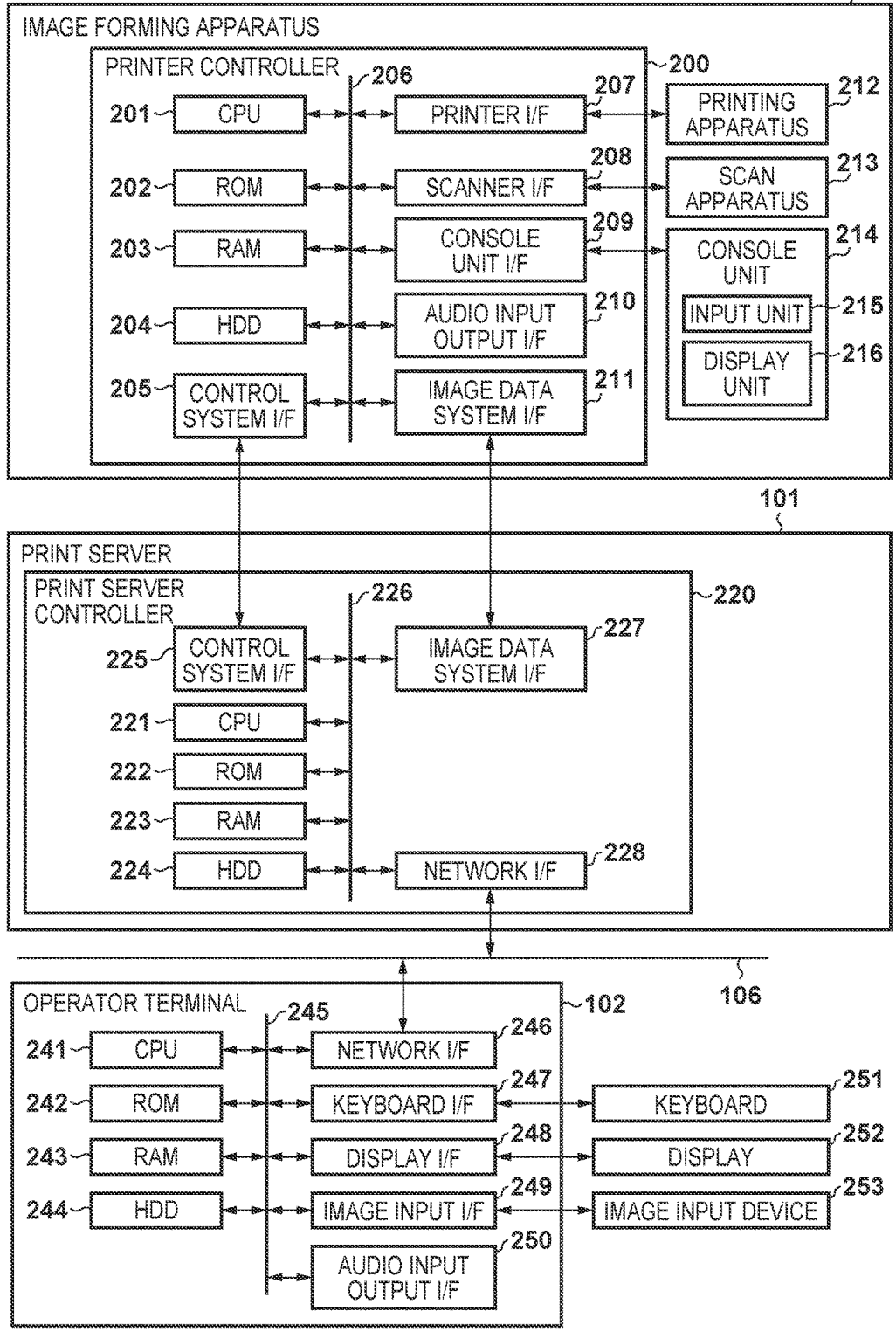
FIG. 2 is a view illustrating a hardware configuration of the remote maintenance system.

Next, description will be given regarding a hardware configuration of a remote maintenance system according to the present embodiment with reference to FIG. 2. The image forming apparatus 100 includes a printer controller 200, a printing apparatus 212, a scan apparatus 213, and a console unit 214. The printer controller 200 includes a CPU 201, a ROM 202, a RAM 203, an HDD 204, a control system I/F 205, a printer I/F 207, a scanner I/F 208, a console unit I/F 209, an audio input output I/F 210, and an image data system I/F 211. Each device of these are connected via a system bus 206.

The CPU 201 comprehensively controls access of the various devices connected to the system bus 206 based on the control program stored in the ROM 202 or the hard disk (HDD) 204. The ROM 202 stores control programs and the like that the CPU 201 is capable of executing. The RAM 203 mainly functions as a main memory of the CPU 201, as a work area and the like, and memory capacity can be expanded by an option RAM connected to an expansion port (not shown). The hard disk (HDD) 204 stores a boot program, various applications, font data, user files, edit files, and the like. Note that although the HDD 204 is used in the present embodiment, an external storage apparatus other than the HDD 204 such as an SD card or a flash memory may be used.

The scanner I/F 208 controls image input from the scan apparatus 213. The printer I/F 207 controls image output to the printing apparatus 212. The console unit I/F 209 controls a display control of a display unit 216 that the console unit 214 includes and an input of various setting information set by an input unit 215. The audio input output I/F 210 controls audio input/output of an audio input/output apparatus such as a headset (not shown). The control system I/F 205 receives necessary information for print control from the print server 101. The image data system I/F 211 receives image data from the print server 101 to be transmitted to the printing apparatus 212. Note, the image forming apparatus 100 communicates with the network 106 by using the print server 101 as a relay. Here, the control system I/F 205 performs transmission/reception of data that is communicated with the network 106.

The print server 101 includes a print server controller 220. The print server controller 220 performs processing necessary for print processing that is executed in the print server 101 such as extraction processing to the image data and analysis of an inputted print job. The print server controller 220 includes a CPU 221, a ROM 222, a RAM 223, an HDD 224, a control system I/F 225, an image data system I/F 227, and a network I/F 228. Each device of these are connected via a system bus 226.

The CPU 221 comprehensively controls access of the various devices connected to the system bus 226 based on the control program stored in the ROM 222 or the hard disk (HDD) 224. The ROM 222 stores control programs and the like that the CPU 221 is capable of executing. The RAM 223 mainly functions as a main memory of the CPU 221, as a work area and the like, and memory capacity can be expanded by an option RAM connected to an expansion port (not shown). The hard disk (HDD) 224 stores a boot program, various applications, font data, user files, edit files, and the like. Note that although the HDD 224 is used in the present embodiment, an external storage apparatus other than the HDD 224 such as an SD card or a flash memory may be used.

The control system I/F 225 transmits necessary information for print control from the image forming apparatus 100. Also, the control system I/F 225 transmits later described support information to the image forming apparatus 100. The image data system I/F 227 transmits the image data output from the printing apparatus 212 to the image forming apparatus 100. The network I/F 228 performs data communication with an external network 106 via the network cable.

Note, as mentioned above, the print server 101 relays communications between the image forming apparatus 100 and the network 106. Here, the control system I/F 225 performs data communication with the image forming apparatus 100 and the network I/F 228 performs data communication with the network 106.

The operator terminal 102 includes a CPU 241, a ROM 242, a RAM 243, an HDD 244, a network I/F 246, a keyboard I/F 247, a display I/F 248, an image input I/F 249, and an audio input/output I/F 250. Each device of these are connected by a system bus 245.

The CPU 241 comprehensively controls access of the various devices connected to the system bus 245 based on the control program stored in the ROM 242 or the hard disk (HDD) 244. The ROM 242 stores control programs and the like that the CPU 241 is capable of executing. The RAM 243 mainly functions as a main memory of the CPU 241, as a work area and the like, and memory capacity can be expanded by an option RAM connected to an expansion port (not shown). The hard disk (HDD) 244 stores a boot program, various applications, font data, user files, edit files, and the like. Note that although the HDD 244 is used in the present embodiment, an external storage apparatus other than the HDD 244 such as an SD card or a flash memory may be used.

The network I/F 246 performs data communication with the external network 106 via the network cable. The keyboard I/F 247 controls a key input from ae keyboard 251 or a pointing device (not shown). The display I/F 248 controls a display of a display 252. The image input I/F 249 controls an image input from an image input apparatus 253 such as a camera. The audio input/output I/F 250 controls audio input/output of an audio input/output apparatus such as a headset (not shown). Note, as mentioned above, although the operator terminal 102 communicates with the image forming apparatus 100 using the print server 101 as a relay, the network I/F 246 controls the data communication.

<Software Configuration>

Figure 3:
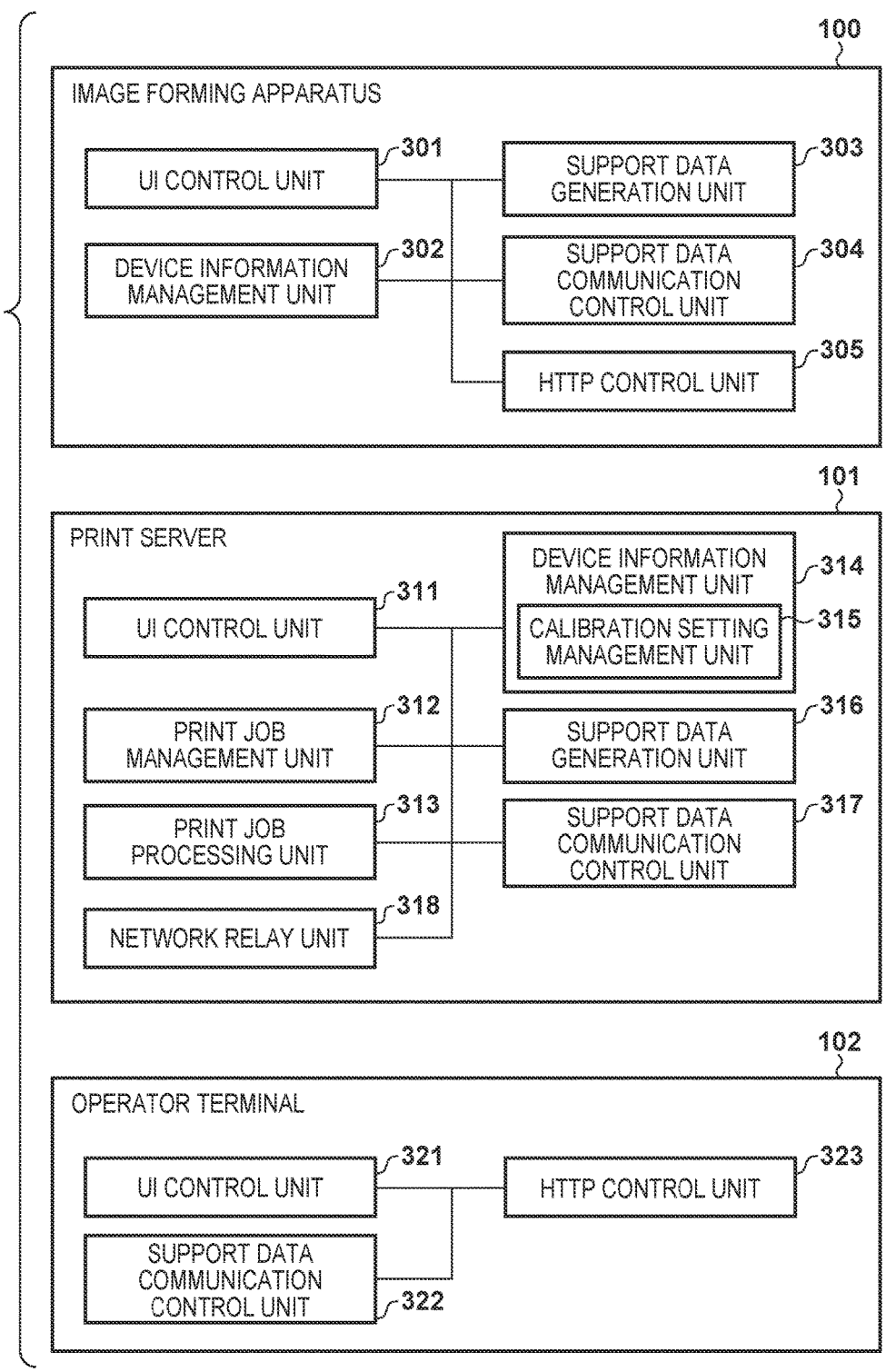
FIG. 3 is a view illustrating a software configuration of the remote maintenance system.

Next, description will be given regarding a software configuration of a remote maintenance system according to the present embodiment with reference to FIG. 3. The image forming apparatus 100 includes a UI control module 301, a device information management unit 302, a support data generation unit 303, a support data communication control unit 304, and an HTTP control unit 305 as software configurations. These software modules are stored as programs in the HDD 204, are read from the RAM 203, and executed by the CPU 201.

The UI control module 301, via the console unit I/F 209, performs display control of the display unit 216 and controls input of various setting information set by the input unit 215. The device information management unit 302 manages various function settings and device information of the image forming apparatus 100. The function settings are settings for an image correction function or a network function for example. Also, the device information is settings of a printer controller, an inline post-processing device (not shown), a cumulative number of print sheets, consumable article information, or the like, for example.

The support data generation unit 303 uses data relating to support content such as media data or remote operation commands stored in the HDD 204 and data obtained from the device information management unit 302, and generates support data to be transmitted to the operator terminal 102. The support data communication control unit 304 makes support data transmission/reception instructions that the support data generation unit 303 generates to the HTTP control unit 305. Also, the support data communication control unit 304 performs input and output of voice or image data via the console unit I/F 209, the audio input output I/F 210, and the image data system I/F 211 as necessary. The HTTP control unit 305 transmits/receives data by HTTP.

The print server 101 includes a UI control unit 311, a print job management unit 312, a print job processing unit 313, a device information management unit 314, a support data generation unit 316, a support data communication control unit 317, and a network relay unit 318 as software configurations. These software modules are stored as programs in the HDD 224, are read from the RAM 223 by the CPU 221, and are executed.

The UI control unit 311 controls a display control of the display of the print server 101 (not shown) and input from the input device (not shown). The print job management unit 312 manages print job data accepted from a user. Specifically, it performs processing such as retrieval of a print job saved in the HDD 224, reflection of a change of a print job setting by a user, and history management of an already printed job.

The print job processing unit 313 performs processing necessary for print processing execution such as analysis of a print job accepted from a user, image data extraction, or image compression/decompression.

The device information management unit 314 manages various function settings and device information of the print server 101. The function settings are settings for an image correction function or a network function for example. Also, the device information is software version information of the print server 101, color process settings, network settings, or the like, for example.

Additionally, the device information management unit 314 has a calibration setting management unit 315 inside it. The calibration setting management unit 315 manages a plurality of calibration settings of the print server 101. Details of the calibration function will be described later.

The support data generation unit 316 uses data obtained from the print job management unit 312 or the device information management unit 314 and generates support data. The support data communication control unit 317 performs an instruction for transmitting the support data that the support data generation unit 316 generated to the image forming apparatus 100.

The network relay unit 318 analyzes packets received by the control system I/F 225 or the network I/F 228. Then, it controls so that if it is determined that data should be relayed between the image forming apparatus 100 and the network 106, that data is relayed.

The operator terminal 102 includes a UI control unit 321, a support data communication control unit 322, and an HTTP control unit 323 as software configurations. These software modules are stored as programs in the HDD 244, are read from the RAM 243 by the CPU 241, and are executed.

The UI control unit 321 controls of keys inputted by the keyboard 251 and display control of the display 252 via the keyboard I/F 247 and the display I/F 248. The support data communication control unit 322 makes support data transmission/reception instructions to the HTTP control unit 323. Also, the support data communication control unit 322 performs input and output of voice or image data via the display I/F 248, the image input I/F 249, and the audio input/output I/F 250 as necessary. The HTTP control unit 323 transmits/receives data by HTTP.

<Processing Procedure>

Figure 4:
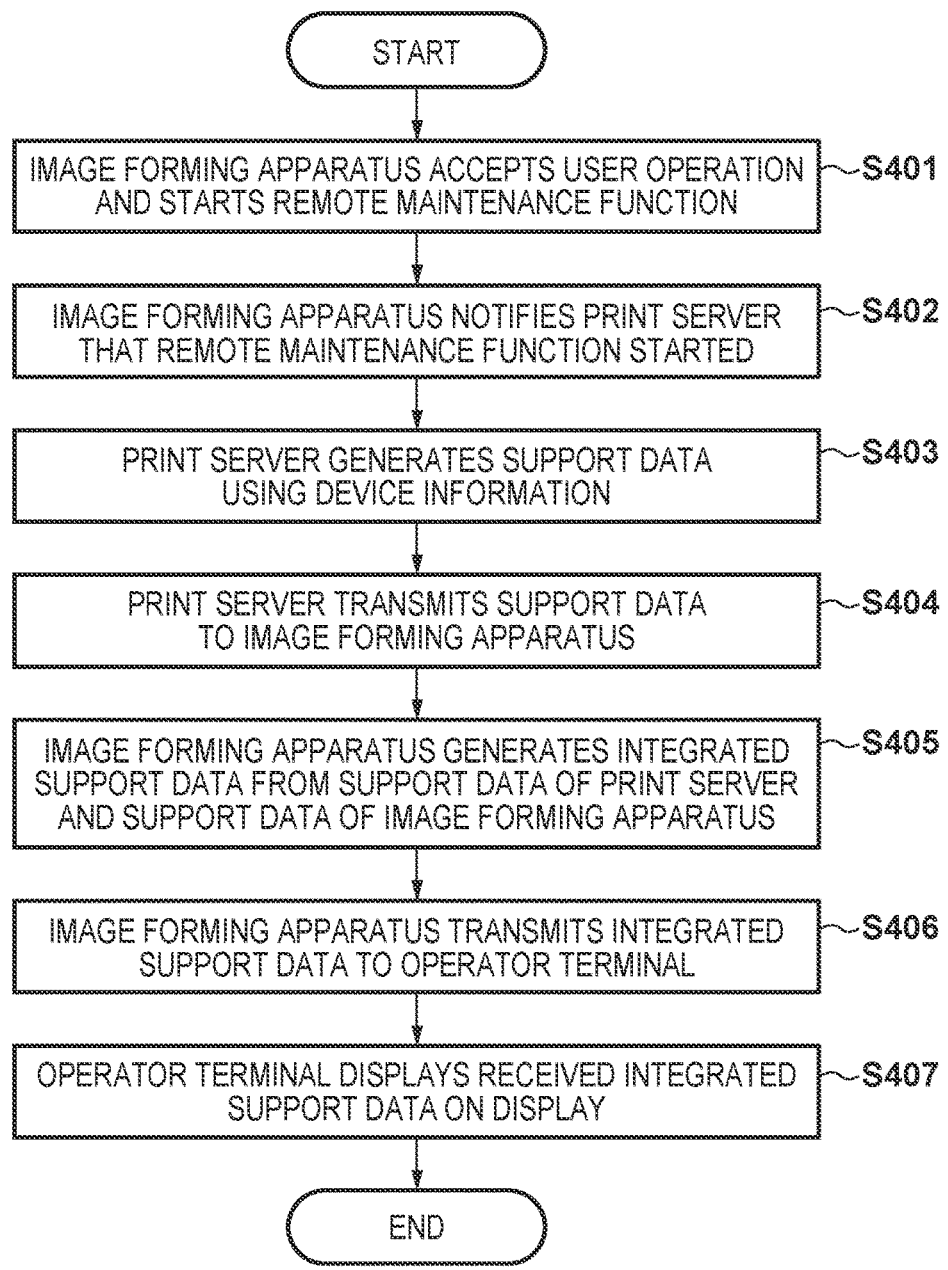
FIG. 4 is a processing flowchart according to an embodiment.

Next, description will be given regarding a processing procedure of the remote maintenance system according to embodiments with reference to FIG. 4. The flowchart is realized by a program stored in the HDD being read to the RAM and executed by the CPU in each of the image forming apparatus 100, the print server 101, and the operator terminal 102. Note, as mentioned above, in the present embodiment, data communication between the image forming apparatus 100 and the operator terminal 102 is performed using the print server 101 as a relay. This is the same in later described embodiments.

In step S401, the UI control module 301 of the image forming apparatus 100 functions as an acceptance unit and accepts a start instruction of the remote maintenance service by a user from the console unit I/F 209. Then, the HTTP control unit 305 starts a communication process of the remote maintenance system with the operator terminal 102 via the relay server 103. In this communication process, remote operation function communication is performed. By the remote operation function, an operator and a user can perform troubleshooting while both looking at the screen of the image forming apparatus 100. There are cases in which the user operates the console unit 214 to change settings in accordance with an instruction of the operator, and there are cases in which the operator changes settings by remote operation. In step S402, the CPU 201 of the image forming apparatus 100 makes a notification that the remote maintenance service has started to the print server 101 through the control system I/F 205.

In step S403, the support data generation unit 316 of the print server 101 obtains device information of the print server 101 from the device information management unit 314 and generates support data. In step S404, the support data communication control unit 317 of the print server 101 transmits the support data to the image forming apparatus 100.

In step S405, the support data generation unit 303 of the image forming apparatus 100 obtains the device information of the image forming apparatus 100 from the device information management unit 302. Additionally, the support data generation unit 303 integrates the device information of the image forming apparatus 100 and the support data of the print server 101 received in step S404, and generates integrated support data. In step S406, the support data communication control unit 304 of the image forming apparatus 100 transmits the integrated support data to the operator terminal 102 of the call-center via the HTTP control unit 305.

In step S407, the support data communication control unit 322 of the operator terminal 102 receives the integrated support data from the image forming apparatus 100 via the HTTP control unit 323. Additionally, the UI control unit 321 displays the received integrated support data on the display 252. By this, in the remote support system according to the embodiment, the support data of the image forming apparatus 100 and the support data of the print server 101 can be presented to the operator using the operator terminal 102.

<Support Data>

Next, description will be given regarding one example of support data in the present embodiment with reference to FIG. 5. Reference numeral 500 is an example of support data generated using device information of the image forming apparatus 100. Here, information of an energy saving function, a priority discharge destination, a print density, a finisher version, and a software version are included as items of data. Reference numeral 510 is an example of support data generated using device information of the print server 101. Here, a software version, a color profile, a toner economization, a resolution, and information of whether or not a mobile print is used, information of whether or not an email service is used, information of whether or not an FTP print is used, and information of a double-sided print are included as data items. In the support data, current values are stored for items such as version information and functions relating to the image forming apparatus 100 and the print server 101. Note, the item names recited in the figure are only examples, and it is possible to include other information in the support data in a similar format.

Reference numeral 520 is generated by the image forming apparatus 100 and is one example of integrated support data of the image forming apparatus 100 and the print server 101. The integrated support data includes data for indicating which device, of the image forming apparatus 100 and the print server 101, each item is information of in addition to the content of the respective support data. Data items whose device information is "printer" indicate information of the image forming apparatus 100. Note, although not exemplified, data may be omitted in a case when there are duplicate data items.

Although in the foregoing embodiment, when the remote maintenance service is started, the support data of each apparatus is generated, integrated, and automatically transmitted to the operator terminal 102, the present invention is not limited to this. In the operator terminal 102, an instruction for obtainment of the support data can be accepted from the operator.

<Screen Examples>

Next, description will be given regarding an example of the remote maintenance service UI screen 600 which is displayed on the display 252 of the operator terminal 102 in the present embodiment with reference to FIG. 6.

The UI control unit 321 of the operator terminal 102 displays the remote maintenance service UI screen 600 on the display 252 when the remote maintenance service is started in step S401. On the remote maintenance service UI screen 600, an overview of a user system configuration, user printer UI screens, and job-specific information is displayed on the display unit 216 of the image forming apparatus 100. Description will be given regarding job-specific information in a fifth embodiment described later.

Furthermore, the remote maintenance service UI screen 600 is configured to include a user device information obtainment instruction unit 601. The UI control unit 321 of the operator terminal 102 detects that the target buttons 611-613 displayed in the user device information obtainment instruction unit 601 are pressed by the operator. Then, the support data communication control unit 322 of the operator terminal 102 requests a transmission, to the image forming apparatus 100, of support data which includes the device information of the device that the user designated.

For example, when a whole system button 611 is pressed by the operator, the processing of step S402 to step S407 is executed, and transmission of the support data which includes the device information of the image forming apparatus 100 and the print server 101, which are the apparatuses included in the remote maintenance system, is requested. Also, when a printer only button 612 is pressed by the operator, the processing of step S402 to step S404 is omitted, integrated support data including only device information of the image forming apparatus 100 is generated in step S405, and subsequent processing is advanced to. Also, when the print server only button 613 is pressed by the operator, integrated support data not including the device information of the image forming apparatus 100 is generated in step S405, and subsequent processing is advanced to.

Next, description will be given regarding an example of the device information display UI screen 700 which is displayed on the display 252 of the operator terminal 102 in step S407 with reference to FIG. 7. The UI control unit 321 of the operator terminal 102 displays the device information display UI screen 700 on the display 252 when a device information display button 614 of the remote maintenance service UI screen 600 is pressed by the operator. The device information display UI screen 700 respectively displays device classifications, item names, and current values which are included in the integrated support data. The example of FIG. 7 is an example of a screen of a case when the device information display button 614 is pressed after the whole system button 611 is pressed. Specifically, integrated support data including device information of both the image forming apparatus 100 and the print server 101 is displayed.

As described above, the image forming apparatus according to embodiments accepts a start of the remote maintenance function for resolving a failure of the image forming apparatus in accordance with instructions of an operator using an external terminal. After that, support data including information of at least one of device information of the print server and device information of the image forming apparatus, which is that is information necessary when the operator analyzes the failure of the image forming apparatus, is generated and transmitted to the external terminal. By this, the remote maintenance system becomes capable of easily providing device information of both the image forming apparatus 100 and the print server 101 within the system to the operator. Accordingly, cause analysis work by the operator is accelerated and resolution of trouble can be performed more quickly than what was conventional. Specifically, failure analysis work by the operator is optimized, and as a result, downtime of the system of the user is reduced and it is possible to suppress a reduction in productivity.

Second Embodiment

Below, description will be given for a second embodiment of the present invention. In a remote maintenance system for a production market, it is often the case that the call-center receives an inquiry regarding an image quality problem from a user. This is because, for a production market user, an output article of the remote maintenance system for the production market is a product, and there is the possibility that it cannot be used if the image quality does not meet a predetermined standard.

There are cases in which a serviceman analyzes a cause of an image quality problem and cases when the remote maintenance system calibration information is necessary. A calibration is a function for, based on a difference between an ideal output state (target state) defined for image processing and a current output state, performing correction processing to absorb the difference. Accordingly, the calibration information includes both the above described target state and the current output state and is information held by the print server 101. The print server 101 applies the calibration function at a time of execution of each print job in accordance with held calibration information.

Hereinafter, description will be given in the present embodiment regarding a configuration in which, at a time of execution of the remote maintenance service, calibration information of the print server 101 is transmitted to the operator terminal as one piece of device setting information and it is presented to the operator. Note that hereinafter, description will be given of only parts different from the foregoing first embodiment and description of similar parts will be omitted. The above described output state is described as something defined by a density, but it is not limited to this. It may be defined by spectral colorimetric values such as L*a*b* for example in accordance with a data format that the calibration function of the remote maintenance system handles.

<Processing Procedure>

Description will be given regarding a processing procedure of the remote maintenance system in the present embodiment with reference to FIG. 8. The flowchart is realized by a program stored in the HDD being read to the RAM and executed by the CPU in each of the image forming apparatus 100, the print server 101, and the operator terminal 102. Note, for processing similar to the flowchart of FIG. 4, the same step numbers are added and description is omitted.

Figure 9:
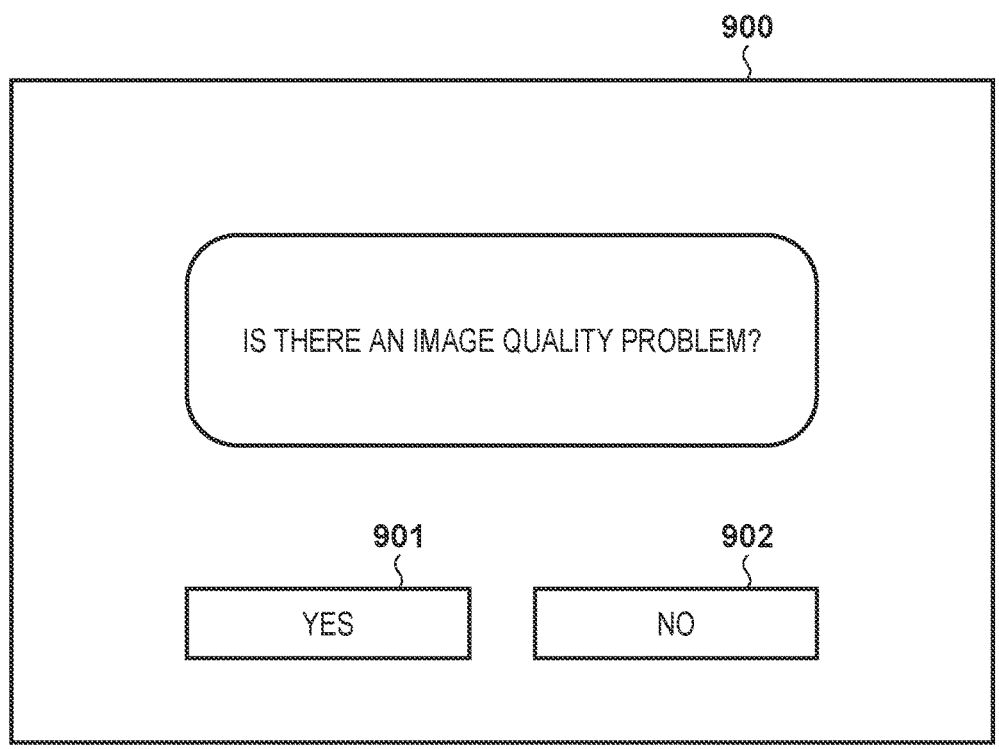
FIG. 9 is a view illustrating one example of an image quality problem existence or absence confirmation UI screen 900 according to an embodiment.

In step S801 following step S402, the CPU 201 of the image forming apparatus 100 determines whether or not to transmit the calibration information of the print server 101 to the operator terminal 102. As the method for this determination, the UI control module 301 of the image forming apparatus 100 displays the existence or absence confirmation UI screen 900 for an image quality problem illustrated in FIG. 9 to the display unit 216 for example. The image quality problem existence or absence confirmation UI screen 900 allows the user to designate whether or not the objective of activating the remote maintenance system is to resolve a problem of image quality. The image forming apparatus 100 makes a notification to the print server 101 that the calibration information is necessary as support data and advances the processing to step S802 when the UI control module 301 detects that a "YES" button 901 is pressed by the user.

On the other hand, the image forming apparatus 100 makes a notification to the print server 101 that the calibration information is unnecessary as support data and advances the processing to step S403 when the UI control module 301 detects that a "NO" button 902 is pressed.

In step S802, the support data generation unit 316 of the print server 101 obtains the calibration information and the device information of the print server 101 from the device information management unit 314 and the calibration setting management unit 315 and generates support data. In such a case, the support data is configured by data of two types: calibration information and device information. The format of the device information data is the same as what was described in FIG. 5 of the above described first embodiment.

The calibration setting management unit 315 of the print server 101 has calibration information for each color of cyan, magenta, yellow, and black, for example. FIG. 10 is one example of the data format of the calibration information. In FIG. 10, although only calibration information of a cyan color is illustrated, data of the same format for other colors may be held.

The calibration information is configured by input signal value 1001 defined by a predetermined number of steps, target density information 1002 for each input signal value, and measurement density information 1003. Note, the measurement density information is acquired by measuring, by a measurement apparatus (not shown), a chart for measurement outputted from the image forming apparatus 100. Also, information of the date and time when a calibration was last executed may be included as the calibration information.

In step S407, the operator terminal 102 displays the integrated support data received to the display 252. Here, although the display method of the device information within the integrated support data is the same as in the foregoing first embodiment, one example of a method of displaying calibration information included in the integrated support data will be described using FIG. 6 and FIG. 11.

Figure 11:
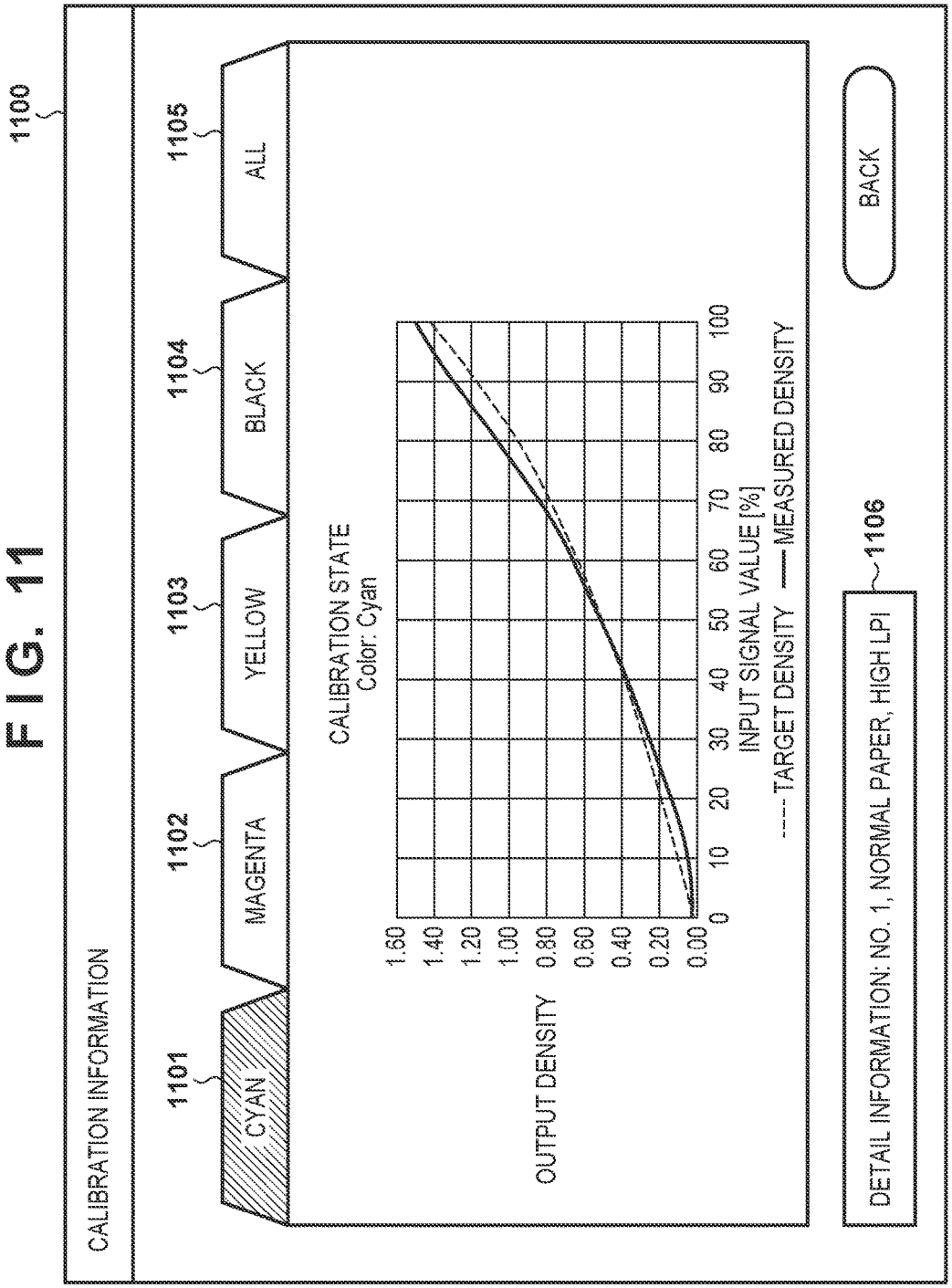
FIG. 11 is a view illustrating an example of a calibration information display UI screen 1100 according to an embodiment.

The UI control unit 321 of the operator terminal 102 displays the display 252 the calibration information display UI screen 1100 of FIG. 11 when a calibration information display button 615 of the remote maintenance service UI screen 600 is pressed by the operator. In a calibration information display UI screen 1100, the calibration information of FIG. 10 is graphed and displayed. FIG. 11 is an example of a display of a case when a cyan color tab 1101 is selected by the operator, and the calibration information for the cyan color is graphed and displayed. Also, the UI control unit 321 of the operator terminal 102 switches display to the calibration information of a selected color when the operator selects any of a magenta color tab 1102, an indigo color tab 1103, and a black color tab 1104. Additionally, the UI control unit 321 of the operator terminal 102 arranges the calibration information of all colors and displays it to the calibration information display UI screen 1100 when an all tab 1105 is selected by the operator.

Note that although it is determined whether or not the calibration information of the print server 101 is transmitted to the operator terminal 102 in step S801 in the flow at a time of starting remote maintenance service in the present embodiment, limitation is not made to this. The operator can request an obtainment of the calibration information at an arbitrary timing after a conversation with the user or a primary investigation. For example, a calibration information obtainment button 616 is arranged on the user device information obtainment instruction unit 601 of FIG. 6. The support data generation unit 316 of the print server 101 obtains calibration information from the calibration setting management unit 315 and generates added support data when the calibration information obtainment button 616 is pressed by the operator. Subsequently, similarly to the embodiment described above, the added support data is transmitted to the operator terminal 102 and displayed on the display 252 via the image forming apparatus 100.

By virtue of the present embodiment, in the remote maintenance system, it is possible to easily obtain from the print server 101 information relating to a calibration whose influence on image quality is large and transmit it to the operator terminal 102. Additionally, analysis work of the operator can be supported by displaying the calibration information to the display 252 of the operator terminal 102. As a result, presentation of a counter-measure to the user can be performed more quickly because a load of the failure analysis work of the operator is reduced.

Third Embodiment

Below, description will be given for a third embodiment of the present invention. While in the foregoing second embodiment, the calibration information that the print server 101 holds is assumed to be of only one type, there are many configurations in which the print server 101 is sophisticated and for a production market, and manages a plurality of calibration settings according to various execution conditions for respective jobs. For example, it may hold calibration settings for each combination of parameters that have a large influence on image quality, such as the paper type or the halftone screen.

Hereinafter, as the present embodiment, description will be given regarding a configuration in which at a time of execution of the remote maintenance service, a plurality of pieces of calibration information that the print server 101 has is transmitted to the operator terminal 102 and displayed. Note that hereinafter, description will be given of only parts different from the foregoing first and second embodiments, and description of similar parts will be omitted.

Figure 8:
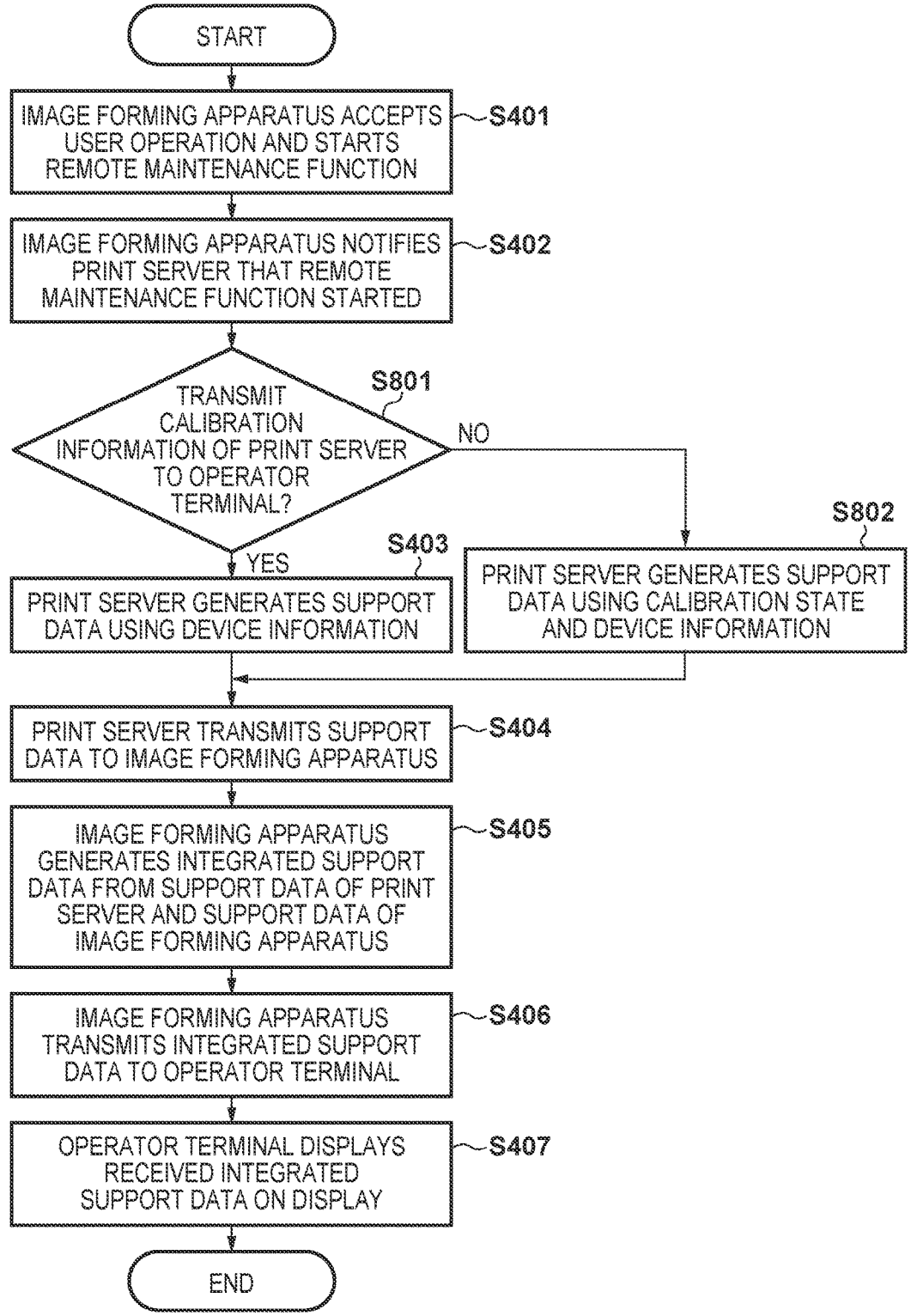
FIG. 8 is a processing flowchart according to an embodiment.

The remote maintenance system in the present embodiment advances the processing in accordance with the flowchart of FIG. 8 which is same as the foregoing second embodiment. In step S802, the support data generation unit 316 of the print server 101 obtains, as the calibration information, all calibration information that the calibration setting management unit 315 recorded and generates support data. Also, in step S809, the UI control unit 321 of the operator terminal 102 displays the list of calibration information UI screen 1200 illustrated in FIG. 12 on the display 252 when the calibration information display button 615 of FIG. 6 is pressed by the operator.

The list of calibration information UI screen 1200 displays a plurality of pieces of calibration information obtained from the print server 101 and parameters such as paper type and halftone corresponding to each piece of calibration information. For example, in the paper type, information such as normal paper, glossy paper, and thick paper is included. Also, in halftone, information of high LPI and a low LPI is included.

Furthermore, the list of calibration information UI screen 1200 has a display button 1201 for each piece of calibration information. The UI control unit 321 displays the calibration information display UI screen 1100 corresponding to the selected calibration information on the display 252 when the display button 1201 for the calibration information is pressed by the operator. In the present embodiment, a detailed information field 1106 for the paper type, the halftone, or the like, corresponding to the selected calibration information is displayed in the calibration information display UI screen 1100.

By virtue of the present embodiment, the operator can easily reference a plurality of pieces of calibration information that the print server 101 has. For this reason, it becomes possible to support the operator in being able to analyze the cause of a user identified image quality problem, having considered various conditions.

Fourth Embodiment

Below, description will be given for a fourth embodiment of the present invention. In the third embodiment described above, a plurality of pieces of calibration information that the print server 101 has is all transmitted to and displayed on the operator terminal 102. However, the present invention is not limited to this configuration. For example, as mentioned above, because the print server 101 has a plurality of calibration settings in accordance with various execution conditions, limitation is not made to all of these being involved in the image quality problem that the user identifies. Accordingly, it can be considered that there will be cases in which there is too much information, and it will be an obstacle to the operator's analysis work in a case when a plurality of pieces of calibration information is transmitted to the operator terminal 102.

Accordingly, in the present embodiment, description will be given regarding a configuration in which information which is necessary in order for the operator's analysis of a failure is selected among a plurality of pieces of calibration information that the print server 101 has, transmitted to the operator terminal 102, and displayed. Note that hereinafter, description will be given of only parts different from the foregoing first through third embodiments, and description of similar parts will be omitted.

Figure 13:
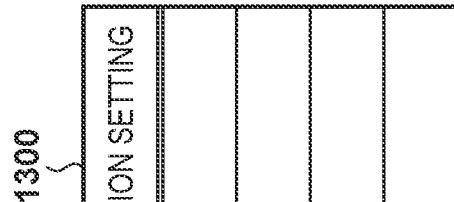
FIG. 13 is a view illustrating one example of already printed job information 1300 according to an embodiment.

The remote maintenance system in the present embodiment advances the processing in accordance with the flowchart of FIG. 8 which is same as the foregoing third embodiment. In step S801, the CPU 201 of the image forming apparatus 100 makes a request to the print server 101 for already printed job information when it is designated by a user that the objective in activating the remote maintenance system is to resolve a problem of image quality. FIG. 13 is one example of the already printed job information 1300 recorded in the print job management unit 312 of the print server 101. A job name, a print completion time, an applied calibration setting, and the like are associated and recorded for each job already printed. The support data communication control unit 317 of the print server 101 transmits the already printed job information 1300 to the image forming apparatus 100.

Figure 14:
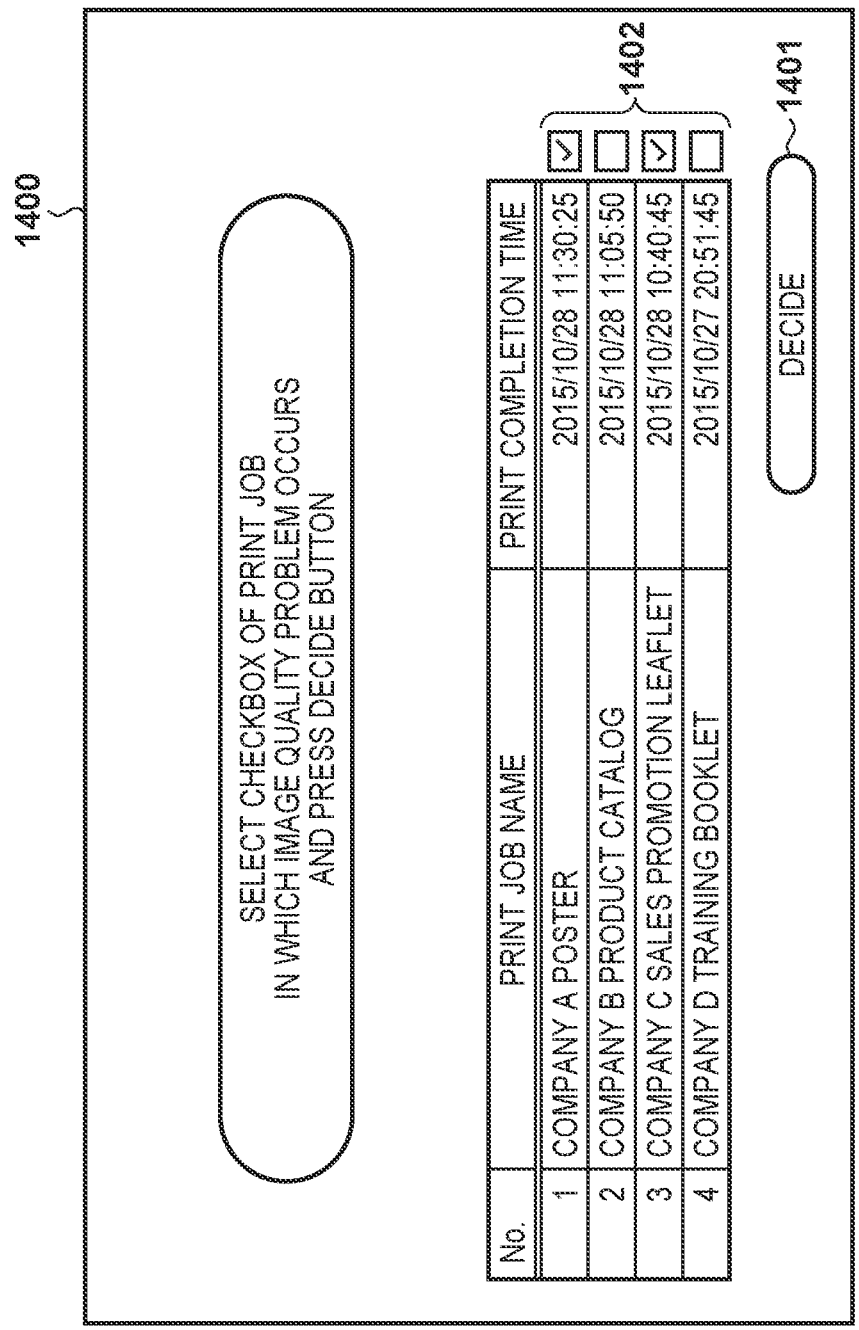
FIG. 14 is a view illustrating one example of a job selection UI screen 1400 according to an embodiment.

The UI control module 301 of the image forming apparatus 100 displays the job selection UI screen 1400 of FIG. 14 to the display unit 216 as a list of execution history of past jobs when the already printed job information 1300 is received. The job selection UI screen 1400 displays a list of information of print jobs that the already printed job information 1300 includes. Also, a user is enabled to select a print job in which an image quality problem occurred by a check-box 1402. FIG. 14 illustrates states in which print jobs of No. 1 and No. 3 are selected by the user. When, after this, a decide button 1401 is pressed by the user, the support data communication control unit 304 of the image forming apparatus 100 transmits information of an already printed job that is selected to the print server 101.

Next, the CPU 221 of the print server 101 determines the calibration setting to transmit to the operator terminal 102 from the result of receiving the selected already printed job and the already printed job information 1300 that the print job management unit 312 records. If the print jobs of No. 1 and No. 3 are selected, it is determined that the calibration setting that is applied is No. 2 according to the already printed job information 1300 of FIG. 13. Accordingly, in the support data generation step of step S802, the support data generation unit 316 obtains only the calibration information of No. 2 by the calibration setting management unit 315, and generates the support data.

Note that in the foregoing embodiment, by allowing a user to select an already printed job in which an image quality problem occurred, calibration information to transmit to the operator terminal 102 is specified, but limitation is not made to this. For example, configuration may be taken so that the support data generation unit 316 of the print server 101 automatically specifies the calibration setting applied to the already printed job that satisfies a predetermined condition, and transmits this in order to reduce the effort of UI operation of the user.

Configuration may be taken to define the predetermined condition to be a number of jobs, among the execution history of past jobs, or that those whose print completion time is within a particular period of time tracing back from the time at which the remote maintenance service is started. For example, assume that jobs for which printing completed within one hour tracing back to the time when the remote maintenance service started are defined as the target. Also, assume that the remote maintenance service started at 11:35:00 on Oct. 28, 2015. In such a case, the print jobs that satisfy the condition are specified to be No. 1, No. 2, and No. 3 from the print completion time information of the already printed job information 1300 of FIG. 13, and the calibration information No. 2 and No. 4 are specified as the transmission targets. Also, as an alternative example, the target may be made to be only one job immediately prior to the starting of the remote maintenance service. In such a case, the print job that satisfies the condition is No. 1, which is executed immediately prior to the start of the remote maintenance function being accepted, and the calibration information No. 2 is specified as the transmission target. Note that this control may be decided depending on a setting by a user input.

By virtue of the present embodiment, it is possible to provide support information to the operator, narrowing down to calibration information having a high relatedness to the image quality problem that is occurring in the user environment. For this reason, the operator is enabled to avoid complication due to excessive information, and analyze the cause of the image quality problem more efficiently.

Fifth Embodiment

Below, description will be given of a fifth embodiment of the present invention. In the fourth embodiment described above, the user is allowed to select an already printed job for which an image quality problem is occurring, and include calibration information applied to the selected already printed job in support data transmitted to the operator terminal 102. However, setting values specific to a print job other than just the calibration state may be the cause of a problem relating to image quality. For example, print sheet information that is used may be the cause. Output by the image forming apparatus 100 is influenced by characteristics such as a surface property or grammage of the print sheet. For example, there is a tendency for output density to increase in relation to the same input signal value the smoother the surface property is. Alternatively, the colorant fixing characteristic may be influenced by the grammage of the sheet.

Accordingly, below, as the present embodiment, a configuration is described in which in addition to the foregoing embodiment support data, job-specific information that can be considered as the cause of an image quality problem is transmitted to the operator terminal 102. Note that hereinafter, description will be given of only parts different from the foregoing embodiments and description of similar parts will be omitted. In the present embodiment, the target of transmission of job-specific information as support data is made to be an already printed job that satisfies a predetermined condition or that is selected by the user, as in the foregoing fourth embodiment.

Below, description assumes that already printed jobs No. 1 and No. 3 designated by the user in the job selection UI screen 1400 are targets. The support data generation unit 316 of the print server 101 specifies the already printed job-specific information selected from the already printed job information 1500 illustrated in FIG. 15 that the print job management unit 312 records. The paper information of the already printed jobs No. 1 and No. 3 are respectively "coated paper (100 g-200 g)" and "coated paper (200 g-300 g)". The support data generation unit 316 of the print server 101 generates data in which the job number, the job name, and paper information are linked as a part of the support data. Note that a calibration setting applied to each target job may be included as the job-specific information. The support data generated from this job-specific information is transmitted from the print server 101 to the image forming apparatus 100 in addition to the foregoing other support data, and thereafter is transmitted to the operator terminal 102.

<Screen Examples>

Next, with reference to FIG. 16, a method of displaying the job-specific information in the operator terminal 102 is described. The operator terminal 102 determines whether or not job-specific information is included when integrated support data is received by the image forming apparatus 100. This determination processing is performed based on the content of the name and file format of the received file, the header file, or the like. Then, when it is determined that the job-specific information is received, the UI control unit 321 of the operator terminal 102 enables the display of a list of target jobs button 621 of the remote maintenance service UI screen 600 of FIG. 6.

Next, when it is detected that the list of target jobs button 621 is pressed by the operator, the UI control unit 321 of the operator terminal 102 displays the list of target jobs screen 1600 illustrated in FIG. 16 on the display 252. In the list of target jobs screen 1600, the job number, the job name, and the paper information and the calibration setting, which are items that have an influence on the image quality, are displayed in a list.

Note that in the present embodiment, the example of paper information is given as the job-specific information that has an influence on image quality, but limitation is not made to this. An ICC profile setting, various image correction function settings, or the like may also be added as targets. In such a case, the support data generation unit 316 of the print server 101 may generate the support data by extracting setting values of these additional items from the print job management unit 312. Also, the UI control unit 321 of the operator terminal 102 may control to display after extending the list of the list of target jobs screen 1600 by the additional items.

By virtue of the present embodiment, it is possible to provide, as support information to the operator, job-specific information in addition to the calibration information for an image quality problem that is occurring in the user environment. For this reason, the operator is enabled to analyze the cause of an image quality problem from both the perspective of the state of the device and the job-specific settings.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-008286 filed on Jan. 19, 2016, which is hereby incorporated by reference herein in its entirety.

What is claimed is:

1. A remote maintenance system including an image forming apparatus that executes an image formation, a print server that executes some image processing for the image formation, and an external terminal, wherein the image forming apparatus comprises:
a memory device that stores a set of instructions;
at least one processor that executes the instructions to:
accept a start of a remote maintenance function for resolving a failure of the image forming apparatus in accordance with an instruction of an operator that uses the external terminal,
obtain, from the print server, device information of the print server which is information that is necessary when the operator analyzes the failure of the image forming apparatus, wherein the device information of the print server indicates setting information that has been set for the print server;
obtain device information of the image forming apparatus, which is information that is necessary when the operator analyzes the failure of the image forming apparatus, wherein the device information of the image forming apparatus indicates setting information that has been set for the image forming apparatus;
generate support data including information of the obtained device information of the print server and the device information of the image forming apparatus, wherein the device information included in the support data includes data for indicating which device information is related to the device information of the print server or the device information of the image forming apparatus; and
transmit the generated support data to the external terminal, and
the external terminal comprises:
a memory device that stores a set of instructions;
at least one processor that executes the instructions to
receive the support data transmitted by the image forming apparatus; and display the support data received by the external terminal.

2. The remote maintenance system according to claim 1, wherein
the at least one processor in the external terminal further executes the instructions to:
set necessary device information in accordance with an input of the operator; and
make a request to the image forming apparatus for the set necessary device information,
wherein the at least one processor of the image forming apparatus executes the instructions to generate the support data which includes the requested set necessary device information.

3. The remote maintenance system according to claim 2, wherein
the at least one processor of the external terminal executes the instructions to further set a necessary parameter included in the device information in accordance with an input of the operator, and
make a request to the image forming apparatus for the set necessary parameter, and
the at least one processor of the image forming apparatus executes the instructions to generate the support data which includes device information that includes the requested set necessary parameter.

4. The remote maintenance system according to claim 3, wherein the necessary parameter is calibration information used in image processing.

5. The remote maintenance system according to claim 4, wherein the calibration information is held by the print server.

6. The remote maintenance system according to claim 4, wherein
a plurality of the calibration information that is according to execution conditions of jobs in the image forming apparatus is included in the support data, and
the at least one processor of the external terminal executes the instructions to display a list of the plurality of the calibration information included in the support data received by the external terminal, and to display calibration information selected by an input of the operator.

7. The remote maintenance system according to claim 4, wherein the at least one processor of the external terminal further executes the instructions to display an execution history of past jobs in the image forming apparatus, and set, as the necessary parameter, the calibration information relating to a job selected by an input of the operator among a plurality of the calibration information that is according to execution conditions of jobs in the image forming apparatus.

8. The remote maintenance system according to claim 4, wherein the at least one processor of the image forming apparatus executes the instructions to further generate the support data, where one or more of the calibration information that is according to an execution condition of a job executed in a predetermined time period until the start of the remote maintenance function is accepted from execution history of past jobs in the image forming apparatus is made to be the necessary parameter.

9. The remote maintenance system according to claim 4, wherein the at least one processor of the image forming apparatus executes the instructions to further generate the support data, where the calibration information that is according to an execution condition of a job executed immediately previously to when the start of the remote maintenance function was accepted from execution history of past jobs in the image forming apparatus is made to be the necessary parameter.

10. The remote maintenance system according to claim 3, wherein the necessary parameter is information relating to a sheet used in image processing.

11. An image forming apparatus that executes an image formation and that is capable of communication with an external terminal and a print server that executes some image processing for the image formation, the image forming apparatus comprising:
a memory device that stores a set of instructions;
at least one processor that executes the instructions to:
accept a start of a remote maintenance function for resolving a failure of the image forming apparatus in accordance with an instruction of an operator that uses the external terminal,
obtain, from the print server, device information of the print server which is information that is necessary when the operator analyzes the failure of the image forming apparatus, wherein the device information of the print server indicates setting information that has been set for the print server;
obtain device information of the image forming apparatus, which is information that is necessary when the operator analyzes the failure of the image forming apparatus, wherein the device information of the image forming apparatus indicates setting information that has been set for the image forming apparatus;
generate support data including information of the obtained device information of the print server and the device information of the image forming apparatus, wherein the device information included in the support data includes data for indicating which device information is related to the device information of the print server or the device information of the image forming apparatus; and
transmit the generated support data to the external terminal.

12. An external terminal capable of communication with an image forming apparatus and a print server that executes some image processing of the image forming apparatus, comprising:
a memory device that stores a set of instructions;
at least one processor that executes the instructions to:
in accordance with an input of an operator for a remote maintenance function using the external terminal, set, from device information of the image forming apparatus and device information of the print server received at the image forming apparatus from the print server, necessary device information which is information that is necessary when analyzing a failure of the image forming apparatus,
make a request to the image forming apparatus for the set necessary device information, wherein the device information indicates setting information that has been set for the image forming apparatus and the print server,
receive from the image forming apparatus support data including information, which is the requested set necessary device information, of device information of the print server and device information of the image forming apparatus, wherein the device information included in the support data includes data for indicating which device information is related to the device information of the print server or the device information of the image forming apparatus, and
display the support data received by the external terminal.

13. A method of controlling a remote maintenance system including an image forming apparatus, a print server that executes some image processing of the image forming apparatus, and an external terminal, the method comprising:
- in the image forming apparatus, accepting a start of a remote maintenance function for resolving a failure of the image forming apparatus in accordance with an instruction of an operator that uses the external terminal;
- in the image forming apparatus, obtaining, from the print server, device information of the print server which is information that is necessary when the operator analyzes the failure of the image forming apparatus, wherein the device information of the print server indicates setting information that has been set for the print server;
- in the image forming apparatus, obtaining device information of the image forming apparatus, which is information that is necessary when the operator analyzes the failure of the image forming apparatus, wherein the device information of the image forming apparatus indicates setting information that has been set for the image forming apparatus;
- in the image forming apparatus, generating support data including information of the obtained device information of the print server and device information of the image forming apparatus, wherein the device information included in the support data includes data for indicating which device information is related to the device information of the print server or the device information of the image forming apparatus; in the image forming apparatus, transmitting to the external terminal the generated support data;
- in the external terminal, receiving the transmitted generated support data; and
- in the external terminal, displaying the received generated support data.

14. A method of controlling an image forming apparatus that executes an image formation and that is capable of communication with an external terminal and a print server that executes some image processing for the image formation, the method comprising:
- accepting a start of a remote maintenance function for resolving a failure of the image forming apparatus in accordance with an instruction of an operator that uses the external terminal;
- obtaining, from the print server, device information of the print server which is information that is necessary when the operator analyzes the failure of the image forming apparatus, wherein the device information of the print server indicates setting information that has been set for the print server;
- obtaining device information of the image forming apparatus, which is information that is necessary when the operator analyzes the failure of the image forming apparatus, wherein the device information of the image forming apparatus indicates setting information that has been set for the image forming apparatus;
- generating support data including information of the obtained device information of the print server and device information of the image forming apparatus, wherein the device information included in the support data includes data for indicating which device information is related to the device information of the print server or the device information of the image forming apparatus; and
- transmitting the generated support data to the external terminal.

15. A method of controlling an external terminal capable of communication with an image forming apparatus that executes an image formation and a print server that executes some image processing for the image formation, the method comprising:
- in accordance with an input of an operator for a remote maintenance function using the external terminal, setting, from device information of the image forming apparatus and device information of the print server received at the image forming apparatus from the print server, necessary device information which is information that is necessary when analyzing a failure of the image forming apparatus;
- making a request to the image forming apparatus for the set necessary device information, wherein the device information indicates setting information that has been set for the image forming apparatus and the print server;
- receiving from the image forming apparatus support data including information, which is the requested set necessary device information, of at least one of device information of the print server and device information of the image forming apparatus, and
- displaying the received support data.

16. A non-transitory computer-readable storage medium storing a computer program for causing a computer to execute a method of controlling an image forming apparatus that executes an image formation and that can communicate with a print server that executes some image processing for the image formation and an external terminal, the method comprising:
- accepting a start of a remote maintenance function for resolving a failure of the image forming apparatus in accordance with an instruction of an operator that uses the external terminal;
- obtaining, from the print server, device information of the print server which is information that is necessary when the operator analyzes the failure of the image forming apparatus, wherein the device information of the print server indicates setting information that has been set for the print server;
- obtain device information of the image forming apparatus, which is information that is necessary when the operator analyzes the failure of the image forming apparatus, wherein the device information of the image forming apparatus indicates setting information that has been set for the image forming apparatus;
- generating support data including information of the obtained device information of the print server and device information of the image forming apparatus, wherein the device information included in the support data includes data for indicating which device information is related to the device information of the print server or the device information of the image forming apparatus; and
- transmitting the generated support data to the external terminal.

17. A non-transitory computer-readable storage medium storing a computer program for causing a computer to execute a method of controlling an external terminal that can communicate with an image forming apparatus and a print server that executes some image processing of the image forming apparatus, the method comprising:
- in accordance with an input of an operator for a remote maintenance function using the external terminal, setting, from device information of the image forming apparatus and device information of the print server received at the image forming apparatus from the print server, necessary device information which is information that is necessary when analyzing a failure of the image forming apparatus;

making a request to the image forming apparatus for the set necessary device information, wherein the device information indicates setting information that has been set for the image forming apparatus and the print server;

receiving from the image forming apparatus support data including information, which is the requested set necessary device information, of at least one of device information of the print server and device information of the image forming apparatus, and displaying the received support data.

* * * * *